United States Patent
Huang et al.

(10) Patent No.: US 9,343,983 B2
(45) Date of Patent: May 17, 2016

(54) CONTROLLER FOR GENERATING JITTERS IN A CONSTANT CURRENT MODE OF A POWER CONVERTER AND METHOD THEREOF

(71) Applicant: Leadtrend Technology Corp., Hsin-Chu (TW)

(72) Inventors: Yu-Yun Huang, Hsin-Chu (TW); Yi-Lun Shen, Hsin-Chu (TW)

(73) Assignee: Leadtrend Technology Corp., Zhubei, Hsinchu County (TW)

( * ) Notice: Subject to any disclaimer, the term of this patent is extended or adjusted under 35 U.S.C. 154(b) by 163 days.

(21) Appl. No.: 14/085,754

(22) Filed: Nov. 20, 2013

(65) Prior Publication Data

US 2014/0140108 A1 May 22, 2014

(30) Foreign Application Priority Data

Nov. 22, 2012 (TW) .............................. 101143676 A

(51) Int. Cl.
*H02M 3/335* (2006.01)

(52) U.S. Cl.
CPC .................................. *H02M 3/33523* (2013.01)

(58) Field of Classification Search
CPC ............ H02M 3/33523; H02M 3/335; H02M 3/3353; H02M 3/33569
USPC ...................................... 363/21.16, 21.18, 73
See application file for complete search history.

(56) References Cited

U.S. PATENT DOCUMENTS

| 7,026,851 | B2* | 4/2006 | Yang et al. ..................... 327/172 |
| 7,671,486 | B2 | 3/2010 | Yang |
| 2008/0192515 | A1* | 8/2008 | Huynh .............. H02M 3/33507 363/21.12 |
| 2010/0128501 | A1* | 5/2010 | Huang .............. H02M 3/33523 363/21.16 |
| 2012/0106208 | A1* | 5/2012 | Sugawara ......... H02M 3/33523 363/21.13 |
| 2012/0275199 | A1* | 11/2012 | Li et al. ....................... 363/21.15 |
| 2013/0033902 | A1* | 2/2013 | Zhang .............. H02M 3/33523 363/15 |
| 2014/0071718 | A1* | 3/2014 | Lin ......................... H02M 1/32 363/21.18 |

FOREIGN PATENT DOCUMENTS

TW             201234748          8/2012

* cited by examiner

*Primary Examiner* — Jessica Han
*Assistant Examiner* — Lorena Bruner
(74) *Attorney, Agent, or Firm* — Winston Hsu; Scott Margo

(57) ABSTRACT

A controller for generating jitters in a constant current mode of a power converter includes a current pin, an auxiliary pin, a constant current control unit, and a control signal generation unit. The current pin is used for receiving a primary side voltage determined according to a resistor and a primary side current flowing through the power converter. The auxiliary pin is used for receiving a voltage corresponding to an auxiliary winding of the power converter. The constant current control unit is used for generating an adjustment signal according to the primary side voltage, a discharge time corresponding to the voltage, and a reference voltage. The reference voltage has a predetermined range jitter voltage. The control signal generation unit is used for adjusting a period of a gate control signal according to the adjustment signal.

9 Claims, 4 Drawing Sheets

# CONTROLLER FOR GENERATING JITTERS IN A CONSTANT CURRENT MODE OF A POWER CONVERTER AND METHOD THEREOF

BACKGROUND OF THE INVENTION

1. Field of the Invention

The present invention relates to a controller for generating jitters in a power converter and a method thereof, and particularly to a controller and a method thereof that can generate jitters in a constant current mode of a power converter.

2. Description of the Prior Art

In a constant current mode of a power converter, a controller for controlling a power switch of a primary side of the power converter includes a peak voltage control unit, a discharge time detection unit, a constant current control unit, and a voltage-controlled oscillator (VCO), which can be applied to operation of the constant current mode of the power converter to provide an approximately predetermined constant current to an output load.

The peak voltage control unit can effectively control a greatest peak current flowing through a secondary side winding of the power converter to be a predetermined value. The discharge time detection unit can generate a discharging signal through a feedback pin and an induced voltage of an auxiliary winding of the power converter, where the discharging signal can be worked as a detection result corresponding to discharge time of the secondary side winding of the power converter. The constant current controller can determine whether charges of the secondary side outputted from a secondary winding during a present switching cycle period is equal to total estimated charges generated from the predetermined constant current according to the discharge time and a switching period provided by a gate pin of the power converter. If variations exist, a control voltage of the VCO is altered so that a clock frequency outputted by VCO is accordingly adjusted, where the adjusted clock frequency influences subsequent switching periods so that total estimated charges of a next switching period are also influenced. Thus, a negative feedback loop is formed. Therefore, the negative feedback loop can make secondary side charges outputted by the secondary side winding during one switching period converge to the total estimated charges, resulting in an average output current of the secondary side winding being approximately converged to the predetermined constant current to achieve a purpose of constant current control.

However, in the constant current mode of the power converter, if jitter voltages of the primary side of the power converter is utilized to generate jitters of the switching period of the power switch, the jitters of the switching period of the power switch may be eliminated by the above mentioned negative feedback loop. Thus, because the jitters of the switching period of the power switch are not generated easily in the constant current mode of the power converter, how to generate the jitters of the switching period of the power switch in the constant current mode of the power converter is an important issue for a designer of the controller of the power switch.

SUMMARY OF THE INVENTION

An embodiment provides a controller for generating jitters in a constant current mode of a power converter. The controller includes a current pin, an auxiliary pin, a constant current control unit, and a control signal generation unit. The current pin is used for receiving a primary side voltage determined according to a resistor and a primary side current flowing through the power converter. The auxiliary pin is used for receiving a voltage corresponding to an auxiliary winding of the power converter. The constant current control unit is coupled to the current pin and the auxiliary pin for generating an adjustment signal according to the primary side voltage, a discharge time corresponding to the voltage, and a reference voltage, where the reference voltage has a predetermined range jitter voltage. The control signal generation unit is coupled to the constant current control unit for adjusting a period of a gate control signal according to the adjustment signal.

Another embodiment provides a method for generating jitters in a constant current mode of a power converter. A controller for generating jitters in the constant current mode includes a current pin, an auxiliary pin, a constant current control unit, a gate pin, and a control signal generation unit, and the control signal generation unit includes an oscillator. The method includes the current pin receiving a primary side voltage determined according to a resistor and a primary side current flowing through the power converter; the auxiliary pin receiving a voltage corresponding to an auxiliary winding of the power converter; the constant current control unit generating an adjustment signal according to the primary side voltage, a discharge time corresponding to the voltage, and a reference voltage, wherein the reference voltage has a predetermined range jitter voltage; and the control signal generation unit adjusting a period of a gate control signal according to the adjustment signal.

The present invention provides a controller for generating jitters in a constant current mode of a power converter and a method thereof. The controller and the method utilize a constant current control unit to generate an adjustment signal according to a primary side voltage, a discharge time of a secondary side of the power converter power converter, and a reference voltage, where the reference voltage has a predetermined range jitter voltage changed with time. Then, a control signal generation unit adjusts a period of a gate control signal according to the adjustment signal. Therefore, compared to the prior art, the present invention can make the period of the gate control signal have a predetermined range jitter in the constant current mode of the power converter to reduce peak power of electromagnetic interference of the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
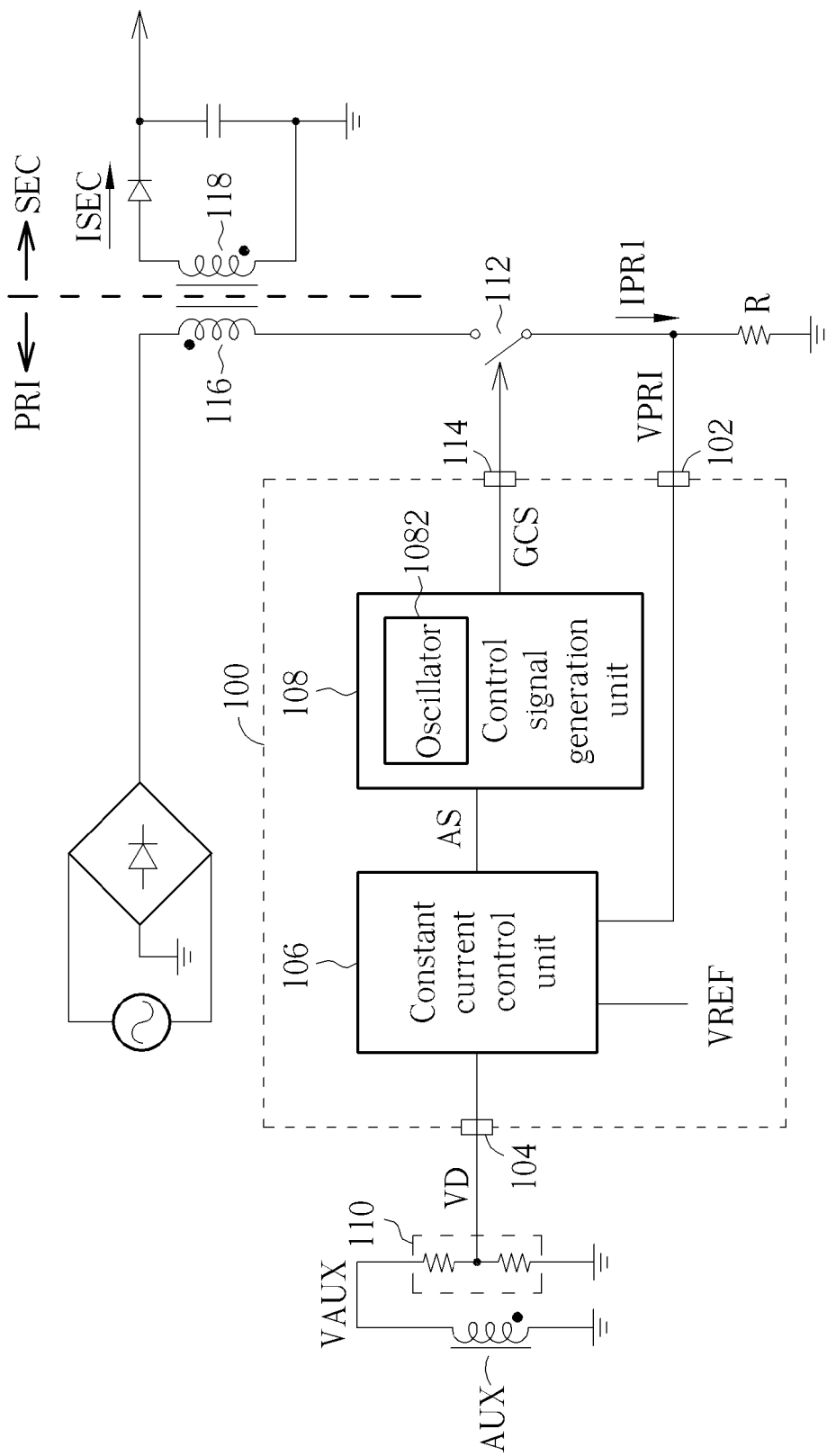
FIG. 1 is a diagram illustrating a controller for generating jitters in a constant current mode of a power converter according to an embodiment.
Figure 2:
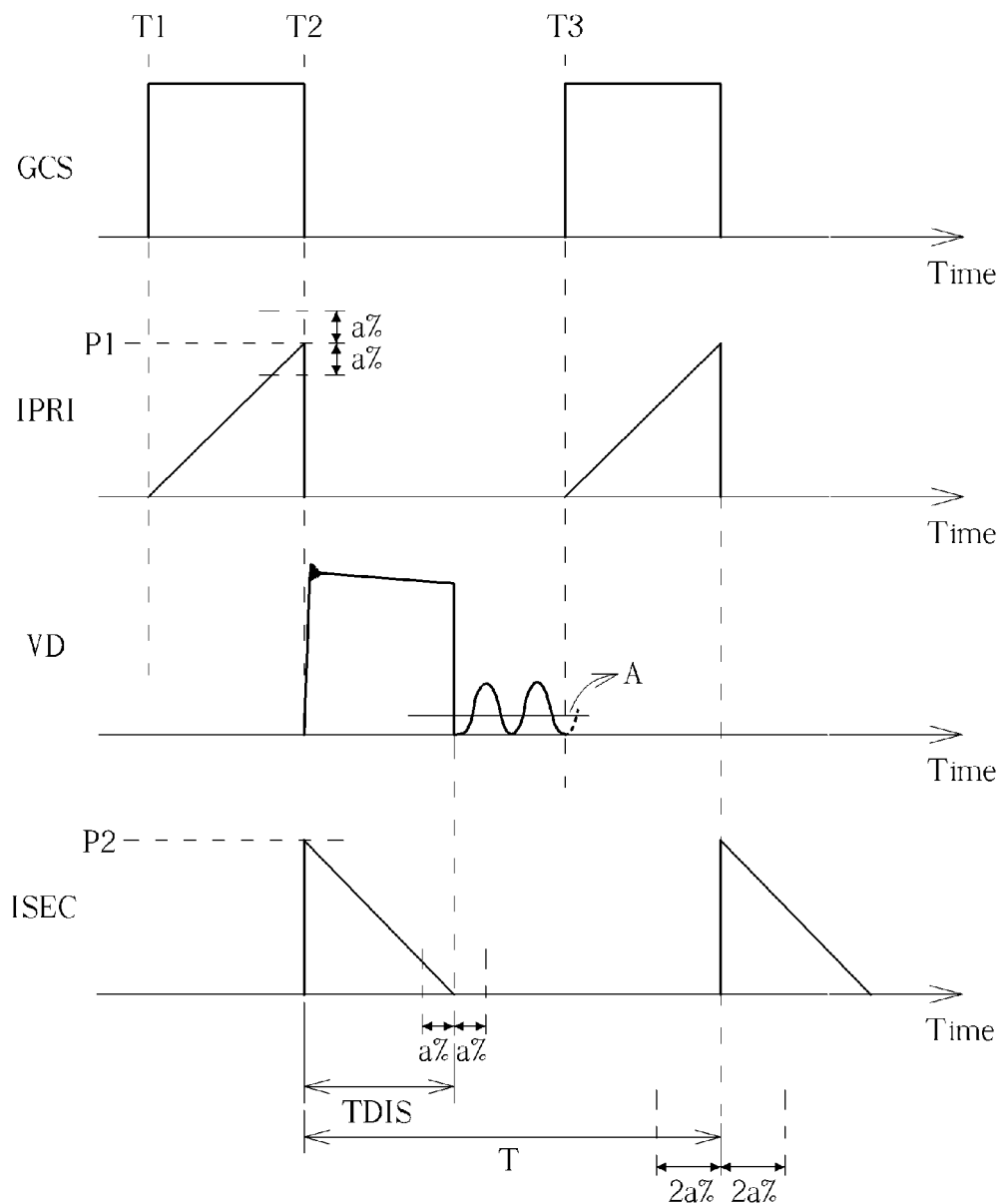
FIG. 2 is a diagram illustrating a primary side current, a voltage, agate control signal, a secondary side current, a discharge time, and a period of the gate control signal.

Please refer to FIG. 1 and FIG. 2. FIG. 1 is a diagram illustrating a controller 100 for generating jitters in a constant current mode of a power converter according to an embodiment, and FIG. 2 is a diagram illustrating a primary side current IPRI, a voltage VD, a gate control signal GCS, a secondary side current ISEC, a discharge time TDIS, and a period T of the gate control signal GCS. As shown in FIG. 1, the controller 100 includes a current pin 102, an auxiliary pin 104, a constant current control unit 106, and a control signal generation unit 108. The current pin 102 is used for receiving a primary side voltage VPRI determined according to a resistor R and the primary side current IPRI flowing through the power converter. The auxiliary pin 104 is used for receiving the voltage VD corresponding to an auxiliary winding AUX of the power converter, where the voltage VD is generated by a voltage divider 110 coupled to the auxiliary winding AUX according to an auxiliary voltage VAUX. The constant current control unit 106 is coupled to the current pin 102 and the auxiliary pin 104 for generating an adjustment signal AS according to the primary side voltage VPRI, the discharge time TDIS corresponding to the voltage VD, and a reference voltage VREF, where the reference voltage VREF has a predetermined range (e.g. ±a %, where a is a real number greater than zero) jitter voltage changed with time. The control signal generation unit 108 is coupled to the constant current control unit 106 and includes an oscillator 1082, where the oscillator 1082 is used for determining an oscillation frequency according to the adjustment signal AS, and the oscillation frequency of the oscillator 1082 is used for adjusting the period T of the gate control signal GCS. Therefore, the control signal generation unit 108 can adjust the period T of the gate control signal GCS according to the oscillation frequency of the oscillator 1082. In addition, the gate control signal GCS is transmitted to a power switch 112 of a primary side PRI of the power converter through a gate pin 114 further included in the controller 100.

As shown in FIG. 1 and FIG. 2, when the control signal generation unit 108 generates the gate control signal GCS to the power switch 112 of the primary side PRI of the power converter at time T1, the power switch 112 is turned on. Meanwhile, the primary side current IPRI is gradually increased from zero. Because the primary side voltage VPRI is determined according to the primary side current IPRI flowing through the power converter and the resistor R, the primary side voltage VPRI is also gradually increased from zero. At time T2, when the primary side voltage VPRI is greater than the reference voltage VREF (corresponding to a peak value P1 of the primary side current IPRI shown in FIG. 2), the control signal generation unit 108 does not generate the gate control signal GCS, resulting in the power switch 112 being turned off and the voltage VD being increased quickly. Meanwhile, the primary side current IPRI is decreased to zero quickly and a secondary side SEC of the power converter starts to discharge. Therefore, a secondary side current ISEC of the power converter starts to decrease to zero from a peak value P2 of the secondary side current ISEC, where time for the secondary side current ISEC starting to decrease to zero from the peak value P2 is the discharge time TDIS. At time T3, as shown in FIG. 1 and FIG. 2, the constant current control unit 106 can generate the gate control signal GCS again according to a trough (e.g. a point A shown in FIG. 2) of the voltage VD, resulting in the controller 100 starting to repeat the above mentioned operation.

Figure 3:
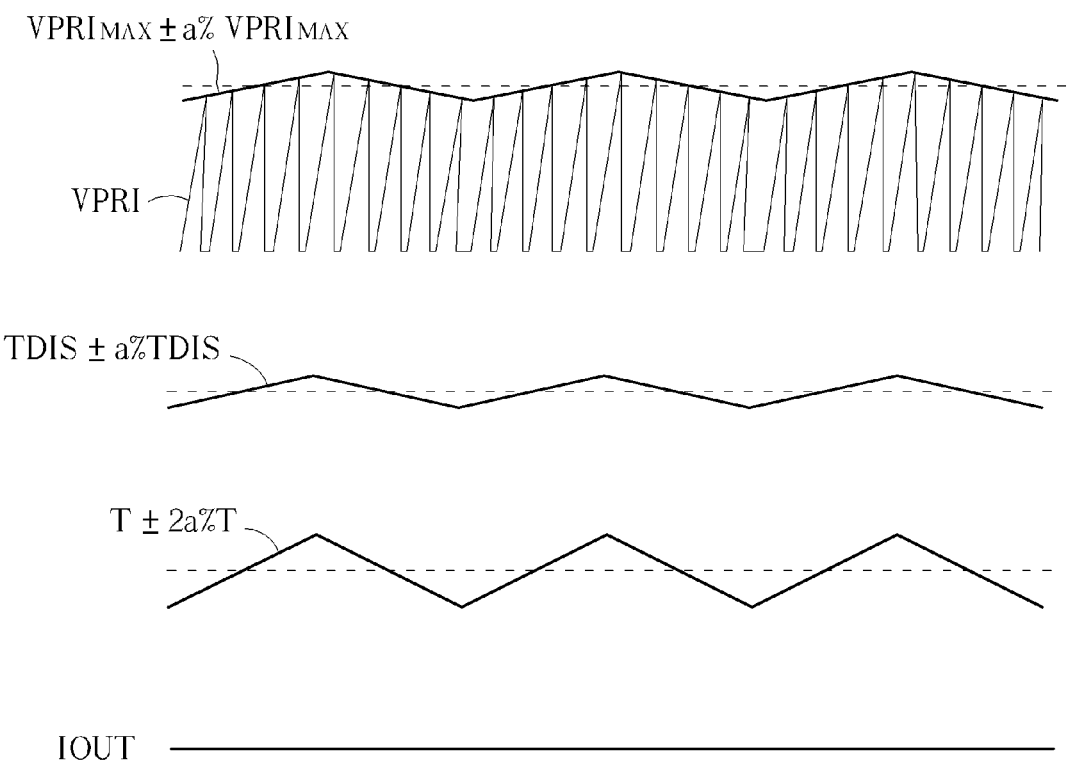
FIG. 3 is a diagram illustrating a maximum value of the primary side voltage, the discharge time, the period of the gate control signal, and an average output current of the secondary side of the power converter.

Please refer to FIG. 3. FIG. 3 is a diagram illustrating a maximum value $VPRI_{MAX}$ of the primary side voltage VPRI, the discharge time TDIS, the period T of the gate control signal GCS, and an average output current IOUT of the secondary side SEC of the power converter. As shown in FIG. 2 and FIG. 3, because the reference voltage VREF has the predetermined range (e.g. ±a %) jitter voltage changed with time, the peak value P1 also has a predetermined range (e.g. ±a %) jitter changed with time, and the primary side voltage VPRI also has a predetermined range (e.g. ±a %) jitter changed with time. In addition, the peak value P2 of the secondary side current ISEC can be determined according to the peak value P1 and a turn ratio of a primary side winding 116 of the power converter to a secondary side winding 118 of the power converter. That is to say, a ratio of the peak value P1 to the peak value P2 is equal to the turn ratio of the primary side winding 116 to the secondary side winding 118. Because the peak value P1 has the predetermined range (e.g. ±a %) jitter changed with time and the ratio of the peak value P1 to the peak value P2 is equal to the turn ratio of the primary side winding 116 to the secondary side winding 118, the discharge time TDIS also has a predetermined range (e.g. ±a %) jitter time changed with time. In addition, a jitter period of the period T of the gate control signal GCS can be determined according to equation (1):

$$IOUT = P2 \times \frac{TDIS}{2T} = \frac{NP}{NS} \times P1 \times \frac{TDIS}{2T} = \frac{NP}{NS} \times \frac{VPRI_{MAX}}{R} \times \frac{TDIS}{2T} \quad (1)$$

As shown in equation (1), IOUT is the average output current of the secondary side SEC of the power converter, and IOUT is constant.

$$\frac{NP}{NS}$$

is the turn ratio of the primary side winding 116 to the secondary side winding 118 and $VPRI_{MAX}$ is the maximum value of the primary side voltage VPRI. Because the power switch 112 is turned off when the primary side voltage VPRI is greater than the reference voltage VREF, the maximum value $VPRI_{MAX}$ of the primary side voltage VPRI also has a predetermined range (e.g. ±a %) jitter changed with time. As shown in equation (1), because the average output current IOUT of the secondary side SEC is constant, the maximum value $VPRI_{MAX}$ of the primary side voltage VPRI has the predetermined range (e.g. ±a %) jitter, and the discharge time TDIS has the predetermined range (e.g. ±a %) jitter time, the constant current control unit 106 generates the adjustment signal AS (having information of the jitter time of the discharge time TDIS and the jitter of the maximum value VPRI of the primary side voltage VPRI) to make the period T adjusted by the control signal generation unit 108 have a two-fold predetermined range (e.g. ±2a %) jitter period to ensure that the average output current IOUT is constant (as shown in FIG. 3)°

Figure 4:
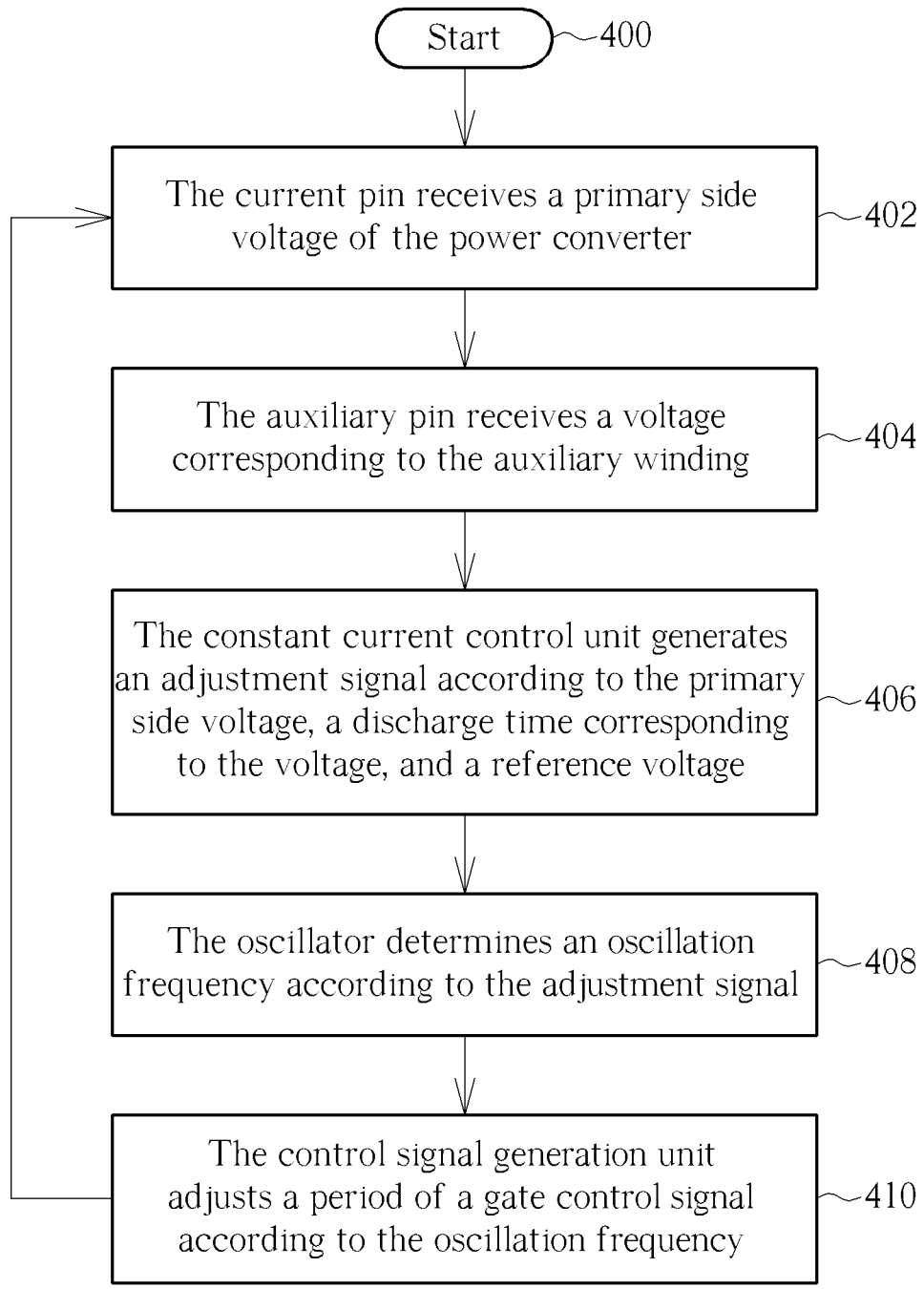
FIG. 4 is a flowchart illustrating a method for generating jitters in a constant current mode of a power converter according to another embodiment.

Please refer to FIG. 1, FIG. 2, FIG. 3, and FIG. 4. FIG. 4 is a flowchart illustrating a method for generating jitters in a constant current mode of a power converter according to another embodiment. The method in FIG. 4 is illustrated using the controller 100 in FIG. 1. Detailed steps are as follows:

Step 400: Start.
Step 402: The current pin 102 receives a primary side voltage VPRI of the power converter.
Step 404: The auxiliary pin 104 receives a voltage VD corresponding to the auxiliary winding AUX.
Step 406: The constant current control unit 106 generates an adjustment signal AS according to the primary side voltage VPRI, a discharge time TDIS corresponding to the voltage VD, and a reference voltage VREF.

Step 408: The oscillator 1082 determines an oscillation frequency according to the adjustment signal AS.

Step 410: The control signal generation unit 108 adjusts a period of a gate control signal GCS according to the oscillation frequency; go to Step 402.

In Step 402, as shown in FIG. 1, the current pin 102 is used for receiving the primary side voltage VPRI determined according to the resistor R and a primary side current IPRI flowing through the power converter. In Step 404, as shown in FIG. 1, the auxiliary pin 104 is used for receiving the voltage VD corresponding to the auxiliary winding AUX, where the voltage VD is generated by the voltage divider 110 coupled to the auxiliary winding AUX according to an auxiliary voltage VAUX. In Step 406, as shown in FIG. 1 and FIG. 2, when the control signal generation unit 108 generates the gate control signal GCS to the power switch 112 of the primary side PRI of the power converter at the time T1, the power switch 112 is turned on. Meanwhile, the primary side current IPRI is gradually increased from zero. Because the primary side voltage VPRI is determined according to the primary side current IPRI flowing through the power converter and the resistor R, the primary side voltage VPRI is also gradually increased from zero. At the time T2, when the primary side voltage VPRI is greater than the reference voltage VREF (corresponding to the peak value P1 of the primary side current IPRI shown in FIG. 2), the control signal generation unit 108 does not generate the gate control signal GCS, resulting in the power switch 112 being turned off and the voltage VD being increased quickly. Meanwhile, the primary side current IPRI is decreased to zero quickly and the secondary side SEC of the power converter starts to discharge. Therefore, a secondary side current ISEC of the power converter starts to decrease to zero from the peak value P2 of the secondary side current ISEC of the power converter, where time for the secondary side current ISEC starting to decrease to zero from the peak value P2 is the discharge time TDIS.

As shown in FIG. 2 and FIG. 3, because the reference voltage
VREF has the predetermined range (e.g. ±a %) jitter voltage changed with time, the peak value P1 also has the predetermined range (e.g. ±a %) jitter changed with time. That is to say, the maximum value $VPRI_{MAX}$ of the primary side voltage VPRI also has the predetermined range (e.g. ±a %) jitter changed with time. In addition, the peak value P2 of the secondary side current ISEC can be determined according to the peak value P1 and the turn ratio of a primary side winding 116 of the power converter to a secondary side winding 118 of the power converter. That is to say, the ratio of the peak value P1 to the peak value P2 is equal to the turn ratio of the primary side winding 116 to the secondary side winding 118. Because the peak value P1 has the predetermined range (e.g. ±a %) jitter changed with time and the ratio of the peak value P1 to the peak value P2 is equal to the turn ratio of the primary side winding 116 to the secondary side winding 118, the discharge time TDIS also has the predetermined range (e.g. ±a %) jitter time changed with time. Therefore, the adjustment signal AS generated by the constant current control unit 106 according to the primary side voltage VPRI, the discharge time TDIS, and the reference voltage VREF has information of the jitter time of the discharge time TDIS and the jitter of the maximum value $VPRI_{MAX}$ of the primary side voltage VPRI.

In Step 408, the oscillator 1082 included in the control signal generation unit 108 can determine the oscillation frequency of the oscillator 1082 according to the adjustment signal AS, where the oscillation frequency of the oscillator 1082 is used for adjusting the period T of the gate control signal GCS. In Step 410, the control signal generation unit 108 can adjust the period T of the gate control signal GCS according to the oscillation frequency of the oscillator 1082. As shown in FIG. 3 and equation (1), because the adjustment signal AS has the information of the jitter time of the discharge time TDIS and the jitter of the maximum value $VPRI_{MAX}$ of the primary side voltage VPRI, the period T of the gate control signal GCS has the two-fold predetermined range (e.g. ±2a %) jitter period changed with time.

To sum up, the controller for generating jitters in the constant current mode of the power converter and method thereof utilize the constant current control unit to generate the adjustment signal according to the primary side voltage, the discharge time of the secondary side of the power converter, and the reference voltage, where the reference voltage has the predetermined range jitter voltage changed with time. Then, the control signal generation unit adjusts the period of the gate control signal according to the adjustment signal. Therefore, compared to the prior art, the present invention can make the period of the gate control signal have the predetermined range jitter in the constant current mode of the power converter to reduce peak power of electromagnetic interference of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for generating jitters in a constant current mode of a power converter, the controller comprising:
    a current pin for receiving a primary side voltage determined according to a resistor and a primary side current flowing through the power converter;
    an auxiliary pin for receiving a voltage corresponding to an auxiliary winding of the power converter;
    a constant current control unit coupled to the current pin and the auxiliary pin for generating an adjustment signal according to the primary side voltage, a discharge time corresponding to the voltage, and a reference voltage, wherein the reference voltage has a predetermined range jitter voltage; and
    a control signal generation unit coupled to the constant current control unit for adjusting a period of a gate control signal according to the adjustment signal, wherein the control signal generation unit comprises:
        an oscillator for determining an oscillation frequency according to the adjustment signal, wherein the oscillation frequency is used for adjusting the period of the gate control signal.

2. The controller of claim 1, wherein the period of the gate control signal has a two-fold predetermined range jitter period.

3. The controller of claim 1, wherein the reference voltage and the primary side voltage is used for turning off a power switch of a primary side of the power converter.

4. The controller of claim 1, further comprising:
    a gate pin, wherein the gate control signal is transmitted to the power switch through the gate pin.

5. The controller of claim 1, wherein the discharge time has a predetermined range jitter time according to the reference voltage and a turn ratio of a primary side winding of the power converter to a secondary side winding of the power converter.

6. A method for generating jitters in a constant current mode of a power converter, a controller for generating jitters in the constant current mode comprising a current pin, an auxiliary pin, a constant current control unit, a gate pin, and a control signal generation unit, the control signal generation unit comprising an oscillator, the method comprising:
- the current pin receiving a primary side voltage determined according to a resistor and a primary side current flowing through the power converter;
- the auxiliary pin receiving a voltage corresponding to an auxiliary winding of the power converter;
- the constant current control unit generating an adjustment signal according to the primary side voltage, a discharge time corresponding to the voltage, and a reference voltage, wherein the reference voltage has a predetermined range jitter voltage;
- the oscillator determining an oscillation frequency according to the adjustment signal; and
- adjusting a period of a gate control signal according to the oscillation frequency;
- wherein the period of the gate control signal is controlled by the oscillation frequency.

7. The method of claim 6, wherein the period of the gate control signal has a two-fold predetermined range jitter period.

8. The method of claim 6, wherein the reference voltage and the primary side voltage is used for turning off a power switch of a primary side of the power converter.

9. The method of claim 6, wherein the discharge time has a predetermined range jitter time according to the reference voltage and a turn ratio of a primary side winding of the power converter to a secondary side winding of the power converter.

* * * * *